| (12) | United States Patent | (10) Patent No.: | US 8,899,042 B2 |
|---|---|---|---|
| | Elsässer et al. | (45) Date of Patent: | Dec. 2, 2014 |

(54) INTERNAL COMBUSTION ENGINE AND ASSOCIATED OPERATIONAL METHOD

(75) Inventors: Alfred Elsässer, Keltern (DE);
Alexander Ullmann, Stuttgart (DE);
Marco Warth, Schorndorf (DE)

(73) Assignee: Mahle International GmbH (DE)

( * ) Notice: Subject to any disclaimer, the term of this patent is extended or adjusted under 35 U.S.C. 154(b) by 389 days.

(21) Appl. No.: 13/318,955

(22) PCT Filed: May 4, 2010

(86) PCT No.: PCT/EP2010/056028
§ 371 (c)(1),
(2), (4) Date: Jan. 18, 2012

(87) PCT Pub. No.: WO2010/128040
PCT Pub. Date: Nov. 11, 2010

(65) Prior Publication Data
US 2012/0124997 A1   May 24, 2012

(30) Foreign Application Priority Data
May 7, 2009   (DE) .......................... 10 2009 020 171

(51) Int. Cl.
*F02B 29/08*   (2006.01)
*F02M 25/07*   (2006.01)
*F02D 41/00*   (2006.01)
*F02B 29/04*   (2006.01)
*F02D 41/10*   (2006.01)

(52) U.S. Cl.
CPC ....... *F02M 25/0713* (2013.01); *F02M 25/0749* (2013.01); *F02M 25/0711* (2013.01); *F02B 29/0412* (2013.01); *Y02T 10/47* (2013.01); *F02D 41/10* (2013.01); *Y02T 10/146* (2013.01); *F02D 41/0065* (2013.01); *F02M 25/0732* (2013.01); *F02D 41/0055* (2013.01); *F02M 25/0744* (2013.01); *F02B 29/083* (2013.01)
USPC .......................................................... 60/615

(58) Field of Classification Search
CPC .............. F02B 29/00; F02D 9/00; F02D 1/00
USPC .................... 60/615, 605.2, 612, 611, 605.1; 123/336
See application file for complete search history.

(56) References Cited

U.S. PATENT DOCUMENTS 4,019,479 A * 4/1977 Garabedian ................ 123/198 F
4,264,535 A * 4/1981 Kikura .......................... 261/23.2
(Continued)

FOREIGN PATENT DOCUMENTS

DE   10240913 A1   3/2004
DE   102006037934 A1   2/2008
(Continued)

OTHER PUBLICATIONS

English Translation of WO 2008017605 A1.*
(Continued)

*Primary Examiner* — Thomas Denion
*Assistant Examiner* — Shafiq Mian
(74) *Attorney, Agent, or Firm* — Rader, Fishman & Grauer PLLC

(57) ABSTRACT

The present invention relates to an internal combustion engine and operating method. The internal combustion engine includes a fresh air system for the supplying of fresh air to at least one combustion chamber; an exhaust gas system for the carrying away of exhaust gas from the at least one combustion chamber; an exhaust gas recycling system for the recycling the exhaust gas from the exhaust gas system into the fresh air system; and at least one additional valve, configured in the fresh air system upstream of at least one inlet valve associated with the at least one combustion chambers. A control device is configured to actuate at least one additional valve such that at least one of a particle content in the exhaust gas and a fuel consumption of the internal combustion engine are at least one of optimum and optimal comprise for at least one environmental parameter.

20 Claims, 5 Drawing Sheets

(56) References Cited

U.S. PATENT DOCUMENTS

| | | | |
|---|---|---|---|
| 4,699,110 A * | 10/1987 | Iwano et al. | 123/472 |
| 5,027,769 A * | 7/1991 | Yoshida et al. | 123/399 |
| 5,394,846 A * | 3/1995 | Jaeger et al. | 123/336 |
| 5,429,087 A * | 7/1995 | Tsujino et al. | 123/336 |
| 6,263,917 B1 * | 7/2001 | Evans | 137/595 |
| 6,381,960 B1 * | 5/2002 | Mårdberg | 60/602 |
| 6,422,222 B1 * | 7/2002 | Arbeiter et al. | 123/568.2 |
| 6,425,381 B1 * | 7/2002 | Rammer | 123/568.12 |
| 7,107,683 B2 * | 9/2006 | Arai et al. | 29/888.4 |
| 7,543,563 B2 * | 6/2009 | Dunn | 123/399 |
| 2002/0005185 A1 * | 1/2002 | Schatz | 123/403 |
| 2005/0076887 A1 | 4/2005 | Surnilla et al. | |
| 2005/0092309 A1 | 5/2005 | Bedkowski et al. | |
| 2006/0196469 A1 | 9/2006 | Kuo et al. | |
| 2007/0131201 A1 * | 6/2007 | Klingseis | 123/442 |
| 2008/0066450 A1 | 3/2008 | Surnilla et al. | |
| 2008/0125953 A1 * | 5/2008 | Bauer et al. | 701/103 |
| 2008/0276614 A1 * | 11/2008 | Shu et al. | 60/602 |
| 2009/0173071 A1 * | 7/2009 | Kapich | 60/605.2 |
| 2010/0162994 A1 | 7/2010 | Elsa et al. | |

FOREIGN PATENT DOCUMENTS

| | | | |
|---|---|---|---|
| DE | 112007001644 T5 | | 5/2009 |
| EP | 1705351 A2 | | 9/2006 |
| EP | 2208875 A1 | | 7/2010 |
| JP | 2007-247617 A | | 9/2007 |
| WO | WO-2008007720 A1 | | 1/2008 |
| WO | WO 2008017605 A1 | * | 2/2008 |
| WO | WO-2008145502 A1 | | 12/2008 |
| WO | WO-2010007026 A1 | | 1/2010 |

OTHER PUBLICATIONS

WO 2008017605 A1 English Translation.*
English abstract for DE-10240913.
English abstract for DE-102006037934.
English abstract for DE-112007001644.
English abstract for EP-1705351.
English abstract for JP-2007-247617.

* cited by examiner

INTERNAL COMBUSTION ENGINE AND ASSOCIATED OPERATIONAL METHOD

CROSS-REFERENCE TO RELATED APPLICATIONS

This application claims priority to German patent application 10 2009 020 171.8 filed on May 7, 2009 and PCT patent application PCT/EP2010/056028 filed on May 4, 2010 which are hereby incorporated by reference in their entirety.

TECHNICAL FIELD

The present invention relates to a method for operating an internal combustion engine, in particular of a motor vehicle. The invention further relates to an internal combustion engine.

BACKGROUND

Modern internal combustion engines which come into use in motor vehicles and in particular in utility vehicles, such as construction site vehicles, off-road vehicles and suchlike, usually comprise a fresh air system for the supplying of fresh air to combustion chambers of the internal combustion engine, and an exhaust gas system for the carrying of exhaust gas away from the combustion chambers. In addition, the equipping of internal combustion engines with an exhaust gas recycling system is known, which recycles exhaust gas from the exhaust gas system into the fresh air system, which is used to reduce pollutant emissions. Furthermore, it is known, in particular for internal combustion engines of passenger vehicles, to arrange at least one additional valve in the fresh air system, upstream of inlet valves associated with the combustion chambers. These additional valves can be used for example to realize an impulse charge. Moreover, it is basically possible to set a desired exhaust gas recycling rate, which is to be realized by means of the exhaust gas recycling system, by corresponding actuation of the at least one additional valve. Here, flow-dynamic effects in the fresh air flow are utilized, in order to generate or respectively intensify pressure oscillations. In so doing, these pressure oscillations can be positioned with regard to their amplitudes such that via negative pressure amplitudes the pressure drop can be set between an inlet of the exhaust gas recycling system connected with the exhaust gas system, and an outlet of the exhaust gas recycling system connected with the fresh air system. The exhaust gas recycling rate can be set via this pressure drop.

SUMMARY

The present invention deals with the problem of indicating an improved embodiment for an operating method of the type named in the introduction or respectively for an internal combustion engine, which is distinguished in particular in that environmentally relevant parameters, such as e.g. pollutant emissions and fuel consumption, are improved.

This problem is solved according to the invention by the subject matter of the independent claims. Advantageous embodiments are the subject matter of the dependent claims.

The invention is based on the general idea of using the at least one additional valve to optimize an environmental parameter of the internal combustion engine in individual operating points of the internal combustion engine or respectively to set an optimized compromise for at least two environmental parameters of the internal combustion engine. For example, for the respective operating point of the internal combustion engine, which is defined by the current load requirement and by the current rotation rate, a minimal fuel consumption or a minimal nitrogen oxide content in the exhaust gas or a minimal particle content in the exhaust gas can be set. Likewise, compromises for at least two such environmental parameters can be realized. The advantages are obvious.

The invention utilizes the knowledge here that by varying a phasing of the at least one additional valve relative to the rotation of a crankshaft of the internal combustion engine or respectively relative to its crankshaft angle, different effects, dependent on the phasing, are present at least on the said environmental parameters. It has therefore been found that the variation of the phasing of the at least one additional valve not only has an influence on the exhaust gas recycling rate, but also on other parameters, namely in particular at least on the above-mentioned three environmental parameters. The knowledge that the individual parameters have distinctly different dependencies on the respective phasing of the at least one additional valve is important here. For example, a minimum for the nitrogen oxide content coincides with a maximum for the particle content, whereas the fuel consumption in this phasing is largely neutral. As the individual patterns of the dependencies between the phasing and the respective environmental parameter are, in addition, asymmetrical, compromises can now be found between at least two parameters, which are distinguished for example by a significantly reduced fuel consumption with distinctly reduced nitrogen oxide content and only moderately increasing particle content. In this example, a somewhat increased particle content does indeed occur, which, however, is able to be controlled in modern exhaust gas systems.

In conventional internal combustion engines and operating methods, in which an exhaust gas recycling rate is not realized with such additional valves, but rather e.g. via a back pressure increase in the exhaust gas system downstream of a branch-off point in which an inlet of the exhaust gas recycling system branches off from the exhaust gas system, by means of corresponding tests and/or calculations a characteristic map is produced, which associates respectively an exhaust gas recycling rate to the individual operating points of the internal combustion engine, resulting in an optimum compromise of the relevant environmental parameters. In the method according to the invention, now not simply this characteristic map, which is relevant for the exhaust gas recycling rate, is undertaken in order to set the respective exhaust gas recycling rate in the individual operating points by means of a corresponding activation of the at least one additional valve in accordance with the characteristic map, but rather in the procedure according to the invention, via the actuation or respectively via the setting of the phasing of the respective additional valve, the exhaust gas recycling rate is not set directly, but rather via the actuation or respectively phasing of the respective additional valve, a targeted setting or respectively optimizing of the environmental parameters takes place. As, however, the actuation or respectively phasing of the respective additional valve also influences the exhaust gas recycling rate, with this procedure also indirectly a setting of the exhaust gas recycling rate takes place, which in connection with the dynamic effects of the respective additional valve is ultimately responsible for the setting of the said environmental parameters.

As the invention therefore differs from a conventional procedure for setting an exhaust gas recycling rate, significantly improved environmental parameters can be realized.

According to an advantageous embodiment, the respective additional valve is configured so that on its actuation it alternately opens and closes off a fresh air path of the fresh air system leading to the combustion chambers. This is not, therefore, a proportional valve, by means of which different opening widths for the cross-section which is able to be flowed through are able to be set in a fixed manner, but rather a valve which via its switching frequency, i.e. via its opening time or respectively via the time between two successive closed positions, influences the fresh air flow in the fresh air path. Hereby, dynamic flow effects, such as e.g. pressure oscillations, can be intensified or respectively produced.

A further development is particularly advantageous in which the respective additional valve is configured so that with a fixed actuation it opens and closes off the fresh air path with a constant correlation to the rotation rate of a crankshaft of the internal combustion engine, i.e. with a constant correlation to the crankshaft angle of the crankshaft. For setting the actuation of the at least one additional valve, a phasing can now be set which is present between the respective additional valve and the crankshaft or respectively its crankshaft angle. For example, the phasing of the respective additional valve can be adjusted with respect to the crankshaft angle (CSA) so that a closing time of the additional valve is freely displaceable in a range of 0° CSA to e.g. 240° CSA. At 0° CSA the intersection point lies between an outlet valve situated in the end phase of its closing movement and an inlet valve of the relevant combustion chamber, situated in the initial phase of its opening movement. This procedure simplifies the activation or respectively actuation of the respective additional valve, because only the phasing has to be adapted, whereas the switching frequency always has the same correlation or respectively proportionality to the rotation rate of the crankshaft, i.e. increases and decreases synchronously to the rotation rate of the crankshaft in the same correlation.

Further important features and advantages of the invention will be apparent from the sub-claims, from the drawings and from the associated figure description with the aid of the drawings.

It is to be understood that the features mentioned above and to be further explained below are able to be used not only in the respectively indicated combination, but also in other combinations or in isolation, without departing from the scope of the present invention.

BRIEF DESCRIPTION OF THE DRAWINGS

Preferred example embodiments of the invention are illustrated in the drawings and are explained in further detail in the following description, wherein identical reference numbers refer to identical or similar or functionally identical components.

There are shown diagrammatically respectively

DETAILED DESCRITION

Figure 1:
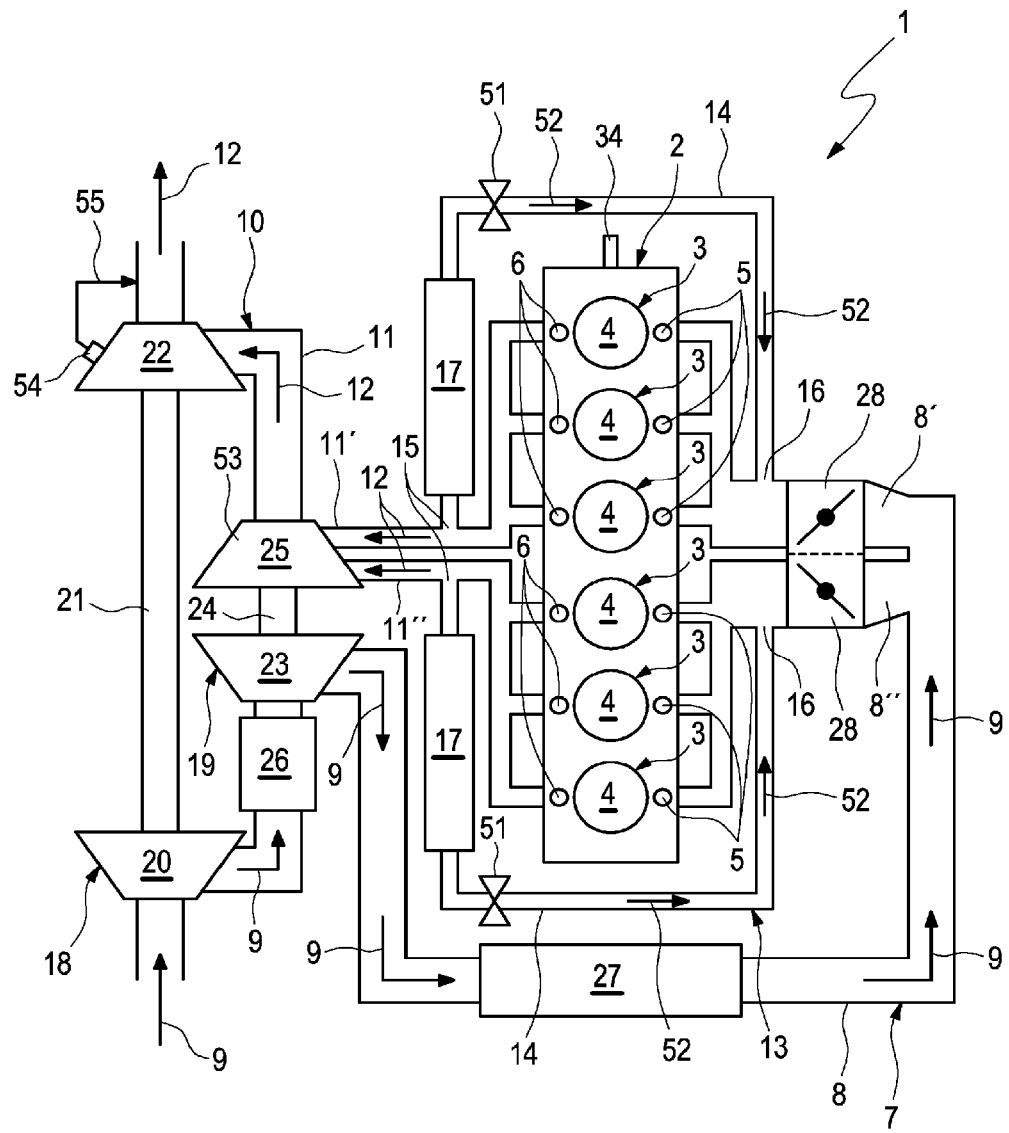
FIG. 1 a greatly simplified schematic diagram, in the manner of a circuit scheme, of an internal combustion engine, FIG. 2 a greatly simplified perspective illustration, partially in section, of an arrangement of two additional valves, FIG. 3 a view as in FIG. 2, but with a single additional valve, FIG. 4 a greatly simplified diagram to illustrate a phase shift between an additional valve and a crankshaft, FIG. 5 a greatly simplified diagram to illustrate a correlation between a phase shift of the additional valve and several parameters of the internal combustion engine, FIG. 6 a simplified diagram to illustrate a correlation between two environmental parameters in a fixed operating point of the internal combustion engine, FIG. 7 a diagram to illustrate a correlation between the phasing of the additional valve and a further parameter internal combustion engine in a fixed operating point, FIG. 8 a diagram to illustrate a transient operating state with a slow or small change, FIG. 9 a diagram as in FIG. 8, but with a quick or great change.

In accordance with FIG. 1, an internal combustion engine 1, as can come into use in motor vehicles, comprises e.g. an engine block 2, which contains several cylinders 3, which respectively surround a combustion chamber 4 and in which a piston, which is not designated further, is arranged so as to be adjustable with regard to stroke. In the example, precisely six such cylinders 3 are arranged in series, purely by way of example and without loss of generality. Gas exchange valves, namely inlet valves 5 and outlet valves 6, which are arranged in the engine block 2, are associated with each combustion chamber 4. In the example, an inlet valve 5 and an outlet valve 6 is provided per combustion chamber 4. It is clear that also two or more inlet valves 5 or respectively two or more outlet valves 6 can be provided. The internal combustion engine 1 serves preferably for use as a vehicle drive for utility vehicles and passenger vehicles, and namely expediently in heavy utility vehicles, such as e.g. construction site vehicles and off-road vehicles.

The internal combustion engine 1 has a fresh air system 7, which serves for the supplying of fresh air to the combustion chambers 4. For this, the fresh air system 7 has a fresh air duct 8, which contains a fresh air path 9, which is indicated by arrows in FIG. 1. In addition, the internal combustion engine 1 is equipped with an exhaust gas system 10, which serves to carry exhaust gas away from the combustion chambers 4. For this, it has an exhaust gas duct 11, which contains an exhaust gas path, which is indicated by arrows. In addition, the internal combustion engine 1 is equipped with an exhaust gas recycling system 13, by which it is possible to recycle exhaust gas from the exhaust gas system 10 to the fresh air system 7. For this, the exhaust gas recycling system 13 has at least one recycling duct 14. In the example, two such recycling ducts 14 are provided. Each recycling duct 14 leads from a branch-off point 15 to a lead-in point 16. At the respective branch-off point 15, the respective recycling duct 14 is connected at the input side with the exhaust gas duct 11. At the respective lead-in point 16, the respective recycling duct 14 is connected with the fresh air duct 8.

In the example, the fresh air system 7 is configured with double flow at least in a section adjoining the combustion chambers 4, so that the fresh air duct 8 in this region has a first flow 8' to supply the first three combustion chambers 4 and a second flow 8" which serves to supply the second three combustion chambers 4. In an analogous manner to this, the exhaust gas system 10 is configured with double flow at least in a section adjoining the combustion chambers 4, so that the exhaust gas duct 11 at least in a section adjoining the combustion chambers 4 has a first flow 11' associated with the first combustion chambers 4 and a second flow 11" associated with the second combustion chambers 4. The two exhaust gas recycling ducts 14 are accordingly associated respectively with one of these flows 8', 8" or respectively 11', 11". In the example, each recycling duct 14 contains an exhaust gas recycling cooler 17.

In addition, the internal combustion engine 1 in the illustrated example is charged so that at least one charging device is provided. In the example, two charging devices are provided, namely a first charging device 18 and a second charging device 19. Both charging devices 18, 19 are configured in the example as exhaust gas turbochargers. Accordingly, the first charging device 18 comprises a first compressor 20, which is arranged in the fresh air duct 8 and which is in driving connection via a first drive shaft 21 with a first turbine 22 which is arranged in the exhaust gas duct 11. The second charging device 19 comprises accordingly a second compressor 23, which is arranged in the fresh air duct 8 and is in driving connection via a second drive shaft 24 with a second turbine 25, which is arranged in the exhaust gas duct 11. The second compressor 23 is arranged here downstream of the first compressor 20, whereas the second turbine 25 is arranged upstream of the first turbine 22. Between the first compressor 20 and the second compressor 23, a first charge air cooler 26 is arranged in the fresh air duct 8. Between the second compressor 23 and the combustion chambers 4, a second charge air cooler 27 is arranged in the fresh air duct 8.

The internal combustion engine 1 is, furthermore, equipped with at least one additional valve 28. In the example of FIG. 1, two such additional valves 28 are provided. The respective additional valve 28 is arranged in the fresh air system 7 upstream of the inlet valves 5. In the example, in the two flows 8', 8" respectively one such additional valve 8 is arranged. Each additional valve 28 is thereby associated with three combustion chambers 4.

Figure 2:
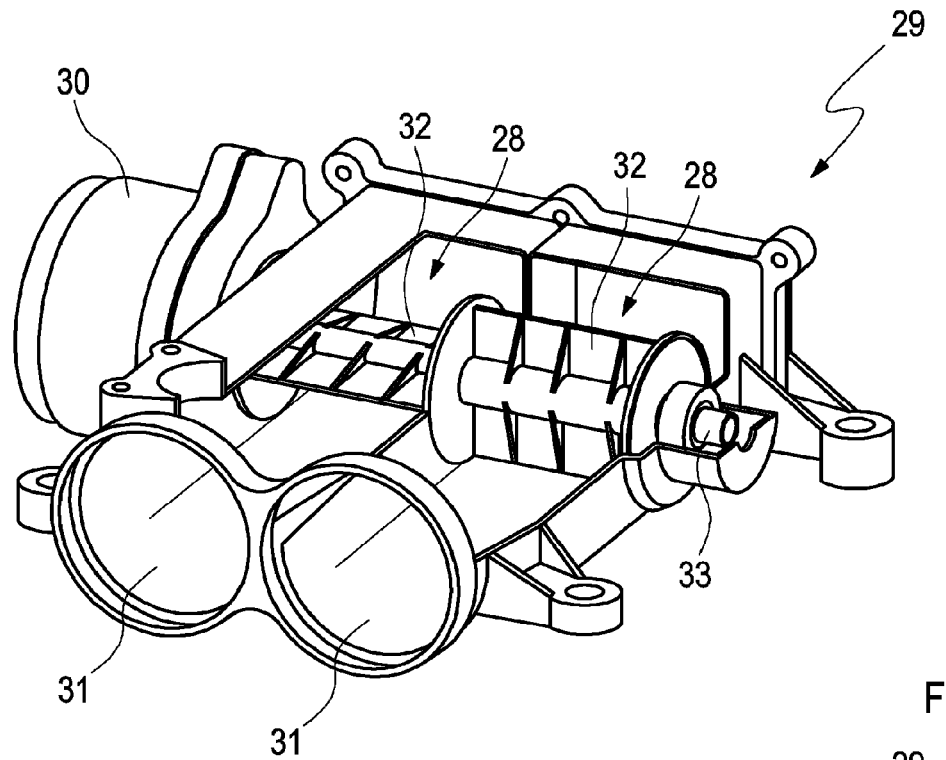

FIG. 2 shows an example for an additional valve device 29, which has two additional valves 28, which can be actuated via a shared drive 30. As can be seen, the additional valve device 29 comprises to duct sections 31 separated from each other in a gas-tight manner, with which the additional valve device 29 can be linked into the two flows 8', 8" of the fresh air system 7. The respective additional valve 28 contains in the respectively associated channel section 31 a valve member 32, which in the example is formed by a flap which can also be designated in particular as a butterfly flap. The valve members 32 are arranged in a torque-proof manner on a shared shaft 33, which is in driving connection with the drive 30. The drive 30 is preferably configured to allow the valve members 32 to rotate. The rotation rate of the drive 30 or respectively of the valve members 32 preferably corresponds precisely to half the rotation rate of a crankshaft 34 of the internal combustion engine 1, indicated in FIG. 1.

Figure 3:
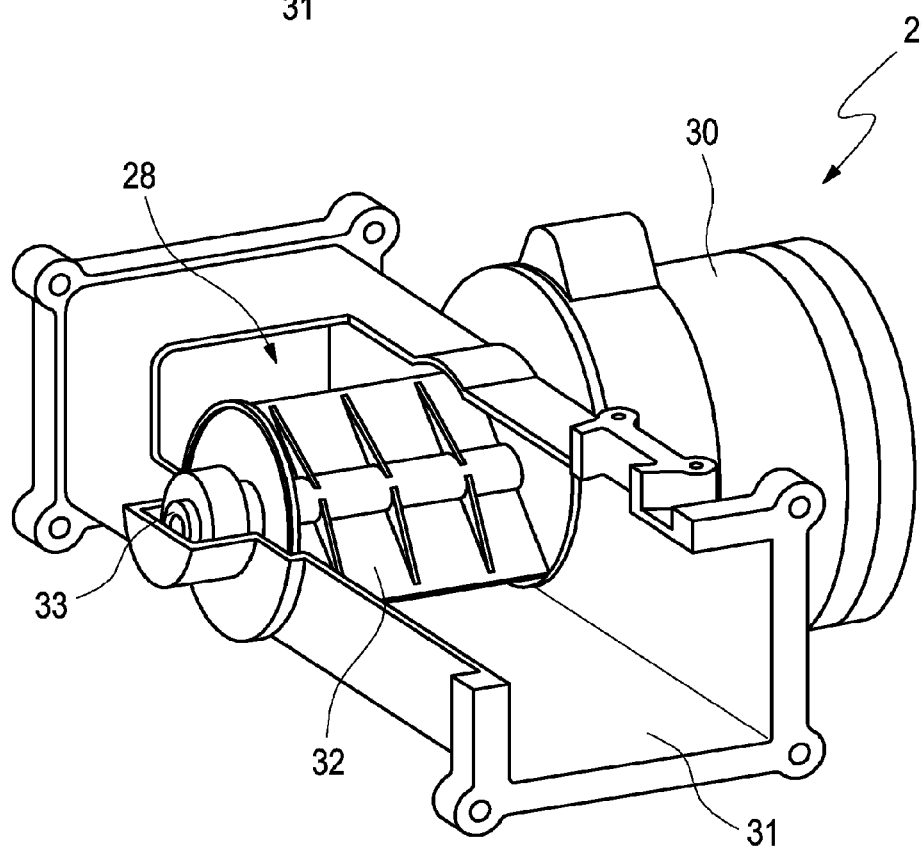

FIG. 3 shows a further embodiment of such an additional valve device 29, which unlike the embodiment shown in FIG. 2 only has a single additional valve 28. Accordingly, this embodiment also comprises only one channel section 31 and a valve member 32 which is arranged in the channel section 31 and is in driving connection with the drive 30 via the shaft 33.

The embodiments shown in FIGS. 2 and 3 show examples for suitable additional valves 28, which on their actuation can alternately open and close off the respective fresh air path 9. For example, the respective valve member 32 rotates in the operation of the internal combustion engine 1, wherein with every complete revolution it passes twice through a closed position, whereas it is open between two successive closed positions. The chronological distance between two successive closed positions or closure phases defines a switching frequency of the respective additional valve 28. Expediently, the respective additional valve 28 is actuated synchronously to the crankshaft 34, so that at least with a fixed actuation of the respective additional valve 28 a constant correlation is present between the rotation rate of the crankshaft 34 and the switching frequency of the respective additional valve 28.

The above-mentioned correlation between crankshaft 34 and additional valve 28 is explained in further detail with reference to the diagram of FIG. 4. In this diagram, the abscissa shows the crankshaft angle in angle degrees, abbreviated to ° CSA. The ordinate shows the stroke of the gas exchange valves. An outlet valve lifting curve 35 and an inlet valve lifting curve 36 are entered into the diagram. The two lifting curves 35, 36 intersect each in a small region. The associated intersection point is arranged in a targeted manner at 0° CSA and corresponds, moreover, to an upper dead centre of a piston movement of the piston associated with the considered combustion chamber.

Figure 4:
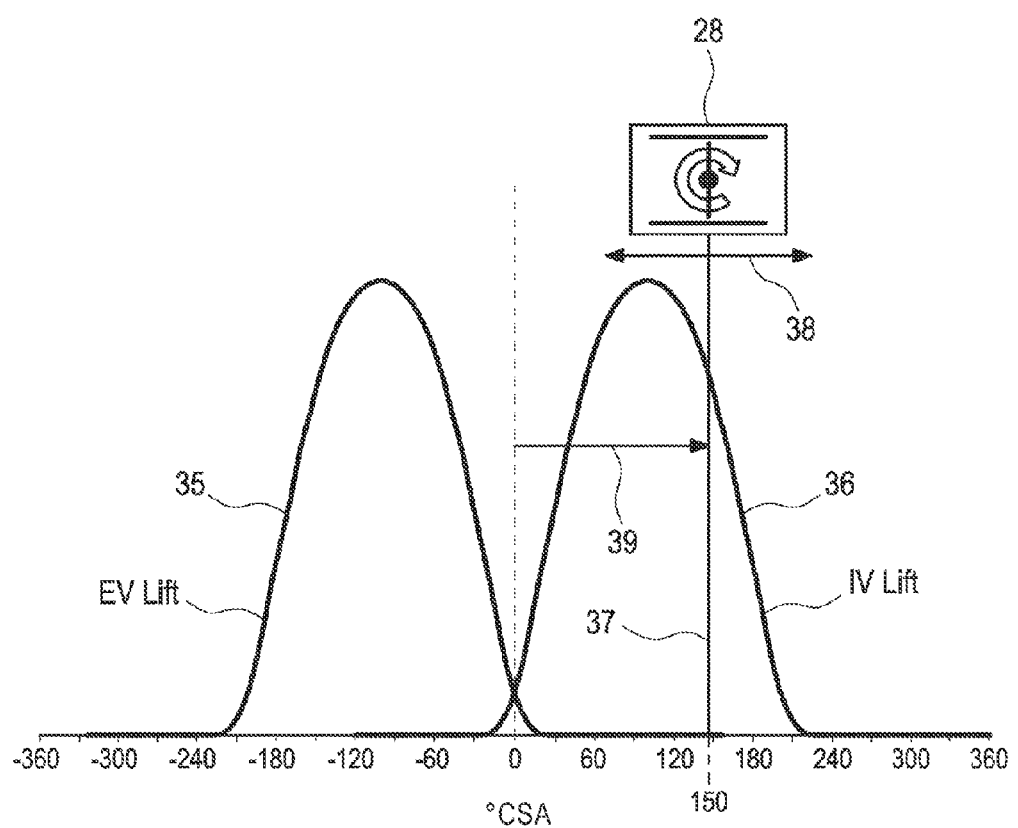

In addition, the diagram of FIG. 4 contains in the form of a vertical line a closure time 37 of the additional valve 28 associated with the considered combustion chamber 4, which in FIG. 4 is likewise represented symbolically for illustration. This closure time 37, with a fixed actuation of the additional valve 28, is always situated in the same relation to the crankshaft 34, i.e. is always at the same crankshaft angle. In the example, the closure time 37 is situated at approximately 150° CSA. The relative position of the closure time 37 relative to the crankshaft angle of the crankshaft 34 defines a phasing between the additional valve 28 and the crankshaft 34. This phasing is adjustable in accordance with a double arrow 38. The closure time 37 is adjustable both in the direction of smaller crankshaft angles and also in the direction of greater crankshaft angles, in order to thus alter the phasing between the additional valve 28 and the crankshaft 34. An arrow 39 indicates that the closure time 37 for example of an initial phasing, at which the closure time 37 lies at 0° CSA, i.e. runs congruent with the ordinate, is displaceable up to the position shown, at which the closure time 37 lies at approximately 150° CSA. It is clear that basically also greater crankshaft angles are able to be set for the closure time 37, e.g. an adjustability up to 240° CSA can be provided.

Figure 5:
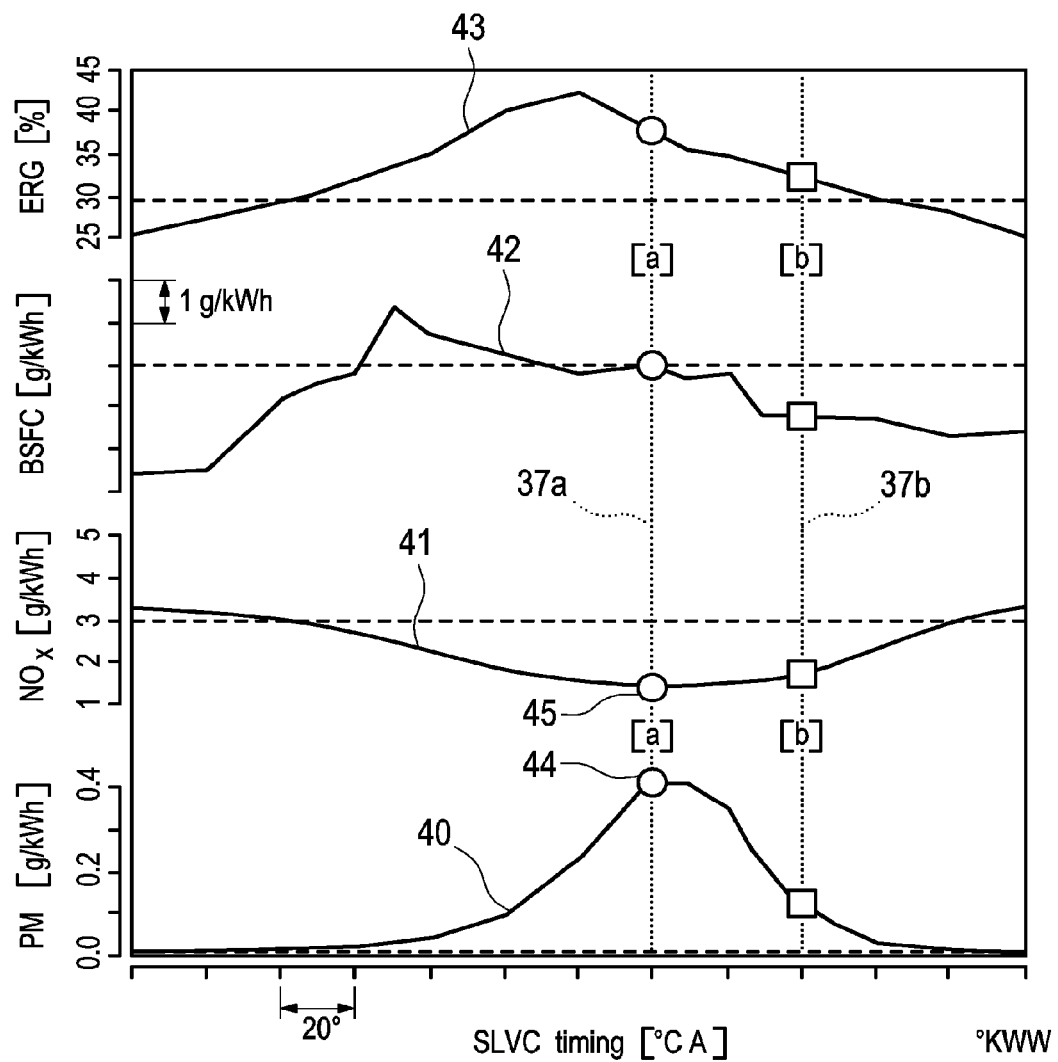

In the diagram of FIG. 5, the phasing for the closure time 37 is reproduced on the abscissa in ° CSA or respectively in ° CA. The ordinate contains one over another the values for a particle content (PM) of the exhaust gases, the values for a nitrogen oxide content (NOx) of the exhaust gases, the values for a fuel consumption (BSFC) of the internal combustion engine and the values for an exhaust gas recycling rate (EGR). Accordingly, the diagram of FIG. 5 contains a course 40, which illustrates the dependence of the particle content in the exhaust gas on the phasing of the additional valve 28, a course 41, which illustrates the dependence of the nitrogen oxide content on the phasing of the additional valve 28, a course 42, which illustrates the dependence of the fuel consumption on the phasing of the additional valve 28, and a course 43, which illustrates the dependence of the exhaust gas recycling rate on the phasing of the additional valve 28. These correlations apply here in a fixed operating point of the internal combustion engine 1, which is defined by a fixed load and a fixed rotation rate.

As can be seen, the individual courses 40 to 43 are entirely different and are partially oppositely directed. By way of example, in the diagram of FIG. 5 for the closure time 37, a first phasing a and a second phasing b are entered. The respective closure time is accordingly designated by 37a or respectively 37b. At the first closure time 37a, the particle content according to the course 40 has a maximum 44, whereas the nitrogen oxide content according to the course 41 has a minimum 45 there. At the same time, for the fuel consumption compared with a basis entered with a broken line, according to the course 42 virtually no change occurs, whereas the exhaust gas recycling rate according to the course 43 assumes a comparatively high value. Such a phasing can be advantageous for a full load operation or respectively for high rotation rates, if owing to the high exhaust gas temperatures a sufficient regeneration of a particle filter can be realized permanently, which receives the increasingly occurring soot particles.

The second phasing b in accordance with the second closure time 37b symbolizes an optimized compromise for the particle content, the nitrogen oxide content and the fuel consumption. As the said parameters have an increased significance for the environment, they are also designated below as environmental parameters. It is clear that in addition to the three named environmental parameters, further environmental parameters can also be able to be influenced with the aid of the phasing of the additional valve 28.

Basically, the internal combustion engine 1 can be operated by means of a control device 46, illustrated in simplified form in FIG. 1, so that a desired exhaust gas recycling rate is set in that by means of the control device 47 the respective additional valve 28 is actuated accordingly. The correlation explained in FIG. 5 shows that for setting the desired exhaust gas recycling rate according to the course 43 only the associated phasing for the additional valve 28 has to be set. The target value of this adjustment or setting is then the exhaust gas recycling rate. This can be expedient for particular operating states or respectively operating points of the internal combustion engine 1. The internal combustion engine 1 presented here, or respectively the operating method presented here takes a different path, however. The target value for the actuation of the respective additional valve 28 is not the exhaust gas recycling rate here, but rather at least one of the environmental parameters of the internal combustion engine 1 which are named above by way of example. For example, provision can be made to set the actuation of the respective additional valve 28 or respectively its phasing in the respective operating point so that a minimum is produced for the nitrogen oxide content. This corresponds in FIG. 5 to the first phasing a. Likewise, it can be desirable to keep the particle content in the exhaust gas below a predetermined threshold value. According to FIG. 5, a different phasing is then to be set for the respective additional valve 28. Likewise, it can be desirable to realize a particular reduction for the fuel consumption, which according to FIG. 5 in turn requires a different timing for the closure time 37 of the respective additional valve 28, i.e. a different phasing. However, an embodiment is preferred in which for the respective current operating point the actuating or respectively the phasing of the respective additional valve 28 is set so that an optimum compromise occurs for at least two of the environmental parameters. In FIG. 5 such a compromise setting is indicated by the second phasing b. The associated exhaust gas recycling rate is then produced automatically.

Such a shifting of the phasing of the respective additional valve 28 can be realized for example in that the associated drive 30 is briefly operated at increased or reduced speed, in order to realize a corresponding advance or lag for the phasing of the valve member 32 relative to the crankshaft 34. Likewise, superordinate phase adjusters can be provided, which can alter the angular position between rotary drive 30 and drive shaft 32, in order to thereby vary the phasing. During the change of the phasing, the respective additional valve 28 operates in a non-fixed manner. The adaption of the phasing can be carried out dynamically here, i.e. during the operation of the internal combustion engine 1. The adapting of the phasing can be carried out very quickly here, i.e. within a very short time. For example, a phase change can be carried out in a time which is less than 360° CSA, i.e. lies within a complete revolution of the crankshaft 34.

Figure 6:
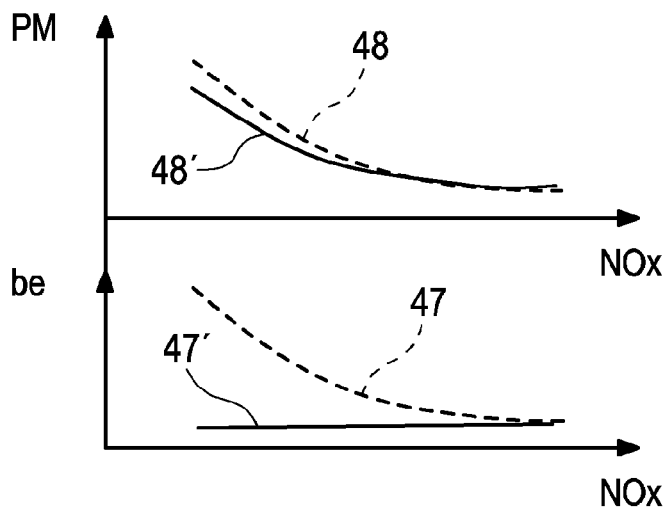

FIG. 6 shows in a diagram the correlation between nitrogen oxide content NOx (abscissa) and fuel consumption be and particle content PM (ordinate) with a fixed operation of the internal combustion engine 1. The courses 47 or respectively 48 without the use of the additional valve 28 are entered here with a broken line. As can be seen, a reduction of the nitrogen oxide values inevitably leads to an increased fuel consumption. At the same time, the particle load increases. On the other hand, the courses 47' or respectively 48' are entered with a continuous line, which are realized when the respective additional valve 28 is actuated with corresponding phasing. As can be seen, the nitrogen oxide emission can be reduced, without the fuel consumption being thereby increased. At the same time, the increase in the particle content can be reduced here.

In particular outside a full load range of the internal combustion engine 1, this correlation can be used to reduce the pollutant emissions. In order to be able to keep the engine load and the rotation rate constant in the respective operating point, injection parameters, such as e.g. injection time and injection quantity, and the number of the individual injections, are varied, whereby a significant reduction in the nitrogen oxide emissions is able to be realized. So that the increase in particle emission and of the fuel consumption, associated with the adapted injection parameters, can be reduced or respectively eliminated, a correspondingly adapted actuation of the respective additional valve 28 takes place.

Figure 7:
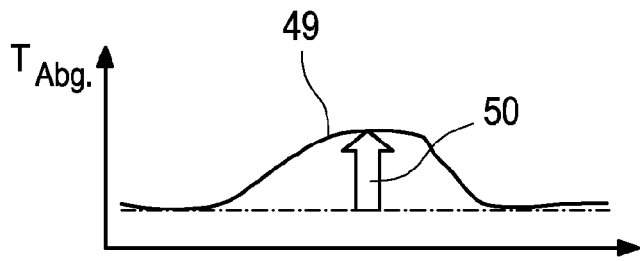

In accordance with a further advantageous embodiment, for a cold start of the internal combustion engine 1 or a light load operation at low rotation rates, provision can be made to set the actuation of the respective additional valve 28 so that thereby an increase in the exhaust gas temperature can be realized. FIG. 7 shows the correlation between an exhaust gas temperature $T_{Abg}$ (ordinate) and the phasing (abscissa), which is designated in FIG. 7 by Phase SLV. Accordingly, a course 49 indicates the dependence of the exhaust gas temperature on the phasing of the respective additional valve 28, wherein one proceeds from identical or respectively constant operating points. An arrow 50 indicates a temperature increase, which is able to be realized in the exhaust gas by setting a corresponding phasing at the respective additional valve 28. For example, hereby a temperature increase of approximately 50° or more can be realized, without a significant increase occurring in the fuel consumption, in order to hold the load. This procedure is also able to be carried out in normal operation of the internal combustion engine 1, when the respective operating point leads to exhaust gas temperatures which are too low for a correct operation of exhaust gas purification devices (particle filters, catalytic converters).

Figure 8:
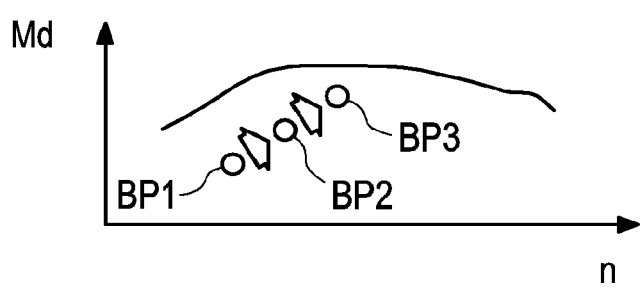

FIG. 8 shows a non-fixed operation of the internal combustion engine 1, in which a transition takes place from a first operating point BP1 via a second operating point BP2 to a third operating point BP3. The operating points BP differ by load Md and rotation rate n. In the example of FIG. 8, the operating state change takes place with a comparatively small load change speed and/or with a small rotation rate change speed. The respective change speed remains here below a predetermined threshold value. In this case, the successive operating points BP1 to BP3 are regarded in a virtually fixed manner as a sequence of fixed operating points. Here, for each individual fixed operating point, respectively the optimum is set for the respective environmental parameter or respectively the respectively optimal compromise for at least two of these environmental parameters. This is possible with the aid of the additional valves 28 which are used here, because these operate extremely dynamically and can set a new phasing within one revolution of the crankshaft 34.

Figure 9:
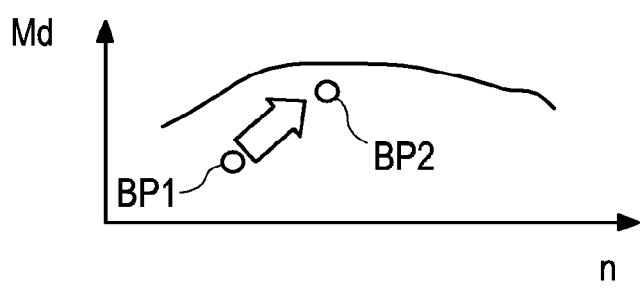

FIG. 9 likewise shows a non-fixed operation of the internal combustion engine 1, in which, however, the load change speed or respectively the rotation rate change speed is comparatively great and therefore lies above the above-mentioned predetermined threshold value. Such a load change or respectively rotation rate change is also designated as a load step or rotation rate step. In this case, the actuation of the respective additional valve 28 can be temporarily set so that for this operating state step a minimal exhaust gas recycling rate occurs. Consequently, a maximum air mass is available for the combustion chambers 4, which assists the light-off performance of the internal combustion engine 1. In order to be able to additionally increase the accelerating power of the internal combustion engine 1, the exhaust gas recycling system 13 in accordance with FIG. 1 can be equipped with at least one blocking valve 51, with the aid of which a recycling path 52, guided in the respective recycling duct 14 and indicated by arrows, can be blocked. As thereby no pressure equalization takes place via the exhaust gas recycling, more air is available again. Furthermore, it is basically possible to activate the respective additional valve 28 optimally, so that an impulse charge of the combustion chambers 4 is produced. Here, flow-dynamic effects are utilized, in order to increase the air mass in the combustion chambers 4.

Through the exhaust gas recycling rate which is reduced with the aid of a corresponding activation of the respective additional valve 28, and if applicable in connection with the additionally named optional measures, a so-called soot blow-off which occurs on such a load step when the internal combustion engine 1 is operated in a conventional manner, can be reduced. With reference to FIG. 9, therefore a jump-like change in operating state from the first operating point BP1 to the second operating point BP2 can be realized with high dynamics, without the otherwise usual soot blow-off thereby occurring.

The procedure described above is preferably to be applied when a load step or respectively rotation rate step is to be carried out, proceeding from a partial load operation of the internal combustion engine 1. However, if the internal combustion engine 1 is already in an upper load range, which still permits a rotation rate step, and/or in an upper rotation rate range, which still permits a load step, the operating method described below can be preferred. In this case, the respective additional valve 28 is actuated or respectively set with respect to its phasing so that a minimal value occurs for the nitrogen oxide content. In fact, with such a setting of the phasing in accordance with the diagram of FIG. 5, an intensive rise in the particle emission occurs, but this can be readily tolerated in the full load range, because modern exhaust gas processing systems operate with particle filters which receive resulting particles. A rapid clogging of the particle filter is not to be expected there, because with this high load range or respectively rotation rate range, comparatively high temperatures prevail in the exhaust gas, so that a passive regeneration of the particle filter takes place permanently, in particular by burning of the soot charge.

At least one of the turbines 22, 25 can be configured variably in accordance with FIG. 1. Turbines with wastegate or with variable turbine geometry 53 are able to be used here. In the example, only the second turbine 25 is equipped with such a variable turbine geometry 53. The variable turbine geometry 53 makes possible a change to the inflow cross-section of the respective turbine 25. In this way, firstly with a reduced exhaust gas mass flow the respective turbine 25 can be kept at an increased rotation rate, in order to thus reduce the so-called turbo lag, i.e. the reaction time of the exhaust gas turbocharger 19 in the case of a load requirement. Secondly, with the aid of the variable turbine geometry 21, the back pressure in the exhaust gas can be increased upstream of the respective turbine 25, whereby the pressure drop between the branch-off point 15 and the lead-in point 16 can be increased for the efficiency of the exhaust gas recycling system 13. Here, however, the exhaust gas counter-pressure, against which the internal combustion engine 1 operates, increases. Consequently, with the same engine load, the fuel consumption increases.

An operating method is preferred, which also actuates the variable turbine geometry 53 for setting a comparatively large inflow cross-section in operating points with reduced load and/or with reduced rotation rate. Consequently, the exhaust gas counter-pressure decreases. A reduction to the exhaust gas recycling rate, which is usually associated therewith, can be equalized by a corresponding phasing of the respective additional valve 28 in accordance with FIG. 5. Consequently, in the respective operating point a sufficiently great exhaust gas recycling rate can also be realized without counter-pressure increase via the variable turbine geometry 53. Therefore, the fuel consumption of the internal combustion engine 1 can be reduced.

Analogous correlations apply for turbines with wastegate, because the exhaust gas counter-pressure, which is influenced by the wastegate, controls or respectively influences the exhaust gas recycling rate. In FIG. 1 by way of example the first turbine 22 is equipped with a wastegate 54 for controlling a bypass 55, at least partially circumventing the turbine 22. By closing the wastegate 54, the exhaust gas pressure rises and the exhaust gas recycling rate increases.

With a charged internal combustion engine 1, which has at least one turbine 22 in the exhaust gas system 10 which is equipped with a wastegate 54 for controlling a bypass 55 at least partially circumventing the turbine 22, the respective wastegate 54 can be actuated in operating points with reduced load and/or rotation rate so that a relatively large flow cross-section occurs for the bypass 55, whilst the at least one additional valve 28 is actuated so that the desired exhaust gas recycling rate occurs.

The invention claimed is:

1. A method for operating an internal combustion engine, comprising:
   supplying fresh air from a fresh air system to at least one combustion chamber of the internal combustion engine;
   removing an exhaust gas from the at least one combustion chamber through an exhaust gas system;
   recycling the exhaust gas through an exhaust gas recycling system into the fresh air system;
   configuring at least one valve in the fresh air system upstream of the at least one combustion chamber, the at least one valve having an adjustable closure time correlated to a rotation rate of a crankshaft of the internal combustion engine;
   actuating the at least one valve in at least one predetermined operating point of the internal combustion engine such that at least one environmental parameter is at a predetermined condition according to the closure time of the at least one valve; and
   setting the closure time of the at least one valve such that the respective predetermined conditions of at least two environmental parameters are each between respective minimum and maximum values, wherein the at least two environmental parameters have an inverse relationship.

2. The method according to claim 1, wherein the actuating of the at least one valve includes alternately opening and closing off a fresh air path of the fresh air system leading fresh air to the at least one combustion chamber.

3. The method according to claim 1, wherein the at least one environmental parameter includes nitrogen oxide content, particle content, and fuel consumption, and further comprising:
adjusting injection parameters for the introduction of fuel into the at least one combustion chamber such that a reduction of the nitrogen oxide content occurs; and
setting the closure time of the at least one valve such that an increase of at least one of the particle content and the fuel consumption is at least one of reduced and eliminated.

4. The method according to claim 1, further comprising setting the closure time of the at least one valve such that an increase of an exhaust gas temperature occurs during at least one of a cold start of the internal combustion engine and during operation with an exhaust gas temperature which is below a predetermined temperature for an exhaust gas aftertreatment.

5. The method according to claim 1, further comprising setting the closure time of the at least one valve for each of a plurality of operating points, at each of which the internal combustion engine has a load change speed and a rotation rate change speed, wherein the internal combustion engine is in a non-fixed operation in which the internal combustion engine operates at each of the plurality of operating points successively, the internal combustion engine differing from one operating point to another in at least one of the load change speed and the rotation rate change speed, and wherein at each of the operating points at least one of the load change speed and the rotation rate change speed is below a predetermined threshold value.

6. The method according to claim 1, wherein the at least one environmental parameter includes an exhaust gas recycling rate, and further comprising setting the closure time of the at least one valve such that the predetermined condition of the exhaust gas recycling rate is at a minimum value, wherein the internal combustion is in a non-fixed operation in which the internal combustion engine operates at each of a plurality of operating points successively, the internal combustion engine differing from one operating point to another in at least one of a load change speed and a rotation rate change speed, and wherein at each of the operating points at least one of the load change speed and the rotation rate change speed lies above a predetermined threshold value.

7. The method according to claim 1, wherein the at least one environmental parameter includes nitrogen oxide content, and further comprising setting the closure time of the at least one valve such that the predetermined condition of the nitrogen oxide content is at a minimum value, wherein the internal combustion engine is in a non-fixed operation in which the internal combustion engine operates at each of a plurality of operating points successively, the internal combustion engine differing from one operating point to another in at least one of a load change speed and a rotation rate change speed, and wherein at each of the operating points at least one of the load change speed and the rotation rate change speed lies above a predetermined threshold value, and at least one of an upper load range and an upper rotation range is present.

8. The method according to claim 1, further comprising actuating a variable turbine geometry of at least one turbine in the exhaust gas system, and setting the closure time of the at least one valve such that a predetermined exhaust gas recycling rate occurs, wherein the internal combustion engine is charged, and in the at least one operating point has at least one of a reduced load and a reduced rotation rate.

9. The method according to claim 1, further comprising actuating a wastegate of at least one turbine in the exhaust gas system, and setting the closure time of the at least one valve such that a predetermined exhaust gas recycling rate, wherein the wastegate is configured to control a bypass at least partially circumventing the turbine, and wherein the internal combustion engine is charged, and in the at least one operating point has at least one of a reduced load and a reduced rotation rate.

10. The method according to claim 1, wherein the actuating of the at least one valve includes alternately opening and closing off of a fresh air path of the fresh air system leading fresh air to the combustion chambers, and wherein the at least one valve is an impulse charging valve.

11. The method according to claim 1, further comprising:
supplying fresh air from the fresh air system to at least one additional combustion chamber via a separate fresh air path than a fresh air path to the at least one combustion chamber;
configuring at least one additional valve in the separate fresh air path upstream of the at least one additional combustion chamber.

12. The method according to claim 1, wherein the closure time of the at least one valve is adjustable between a crankshaft angle (CSA) of the internal combustion engine between 0 degrees CSA and 240 degrees CSA.

13. The method according to claim 2, wherein the opening and closing off of the fresh air path is determined by an adjustable phasing between the closure time of the at least one valve and the rotation rate of the crankshaft of the internal combustion engine.

14. The method according to claim 6, further comprising activating at least one blocking valve of the exhaust gas recycling system to block a recycling path leading the exhaust gas from the exhaust gas system to the fresh air system.

15. The method according to claim 6, further comprising setting the closure time of the at least one valve such that an impulse charge occurs, wherein the at least one valve is an impulse charging valve.

16. The method according to claim 11, further comprising arranging the at least one valve and the at least one additional valve in a shared housing.

17. The method according to claim 16, further comprising synchronously driving the at least one valve and the at least one additional valve by a shared drive.

18. The method according to claim 17, wherein the synchronously driving includes driving a shared shaft rotatingly, wherein the at least one valve and the at least one additional valve each have a valve member, the respective valve members being arranged in a torque-proof manner on the shared shaft.

19. The method according to claim 18, further comprising arranging the valve members phase-shifted relative to each other in the rotation direction on the shared shaft.

20. An internal combustion engine, comprising:
a fresh air system configured to supply fresh air to at least one combustion chamber;
an exhaust gas system configured to carry away exhaust gas from the at least one combustion chamber;
an exhaust gas recycling system configured to recycle at least a portion of the exhaust gas from the exhaust gas system into the fresh air system;
at least one valve positioned in the fresh air system upstream of the at least one combustion chamber, the at least one valve having an adjustable closure time; and
a control device for operating the internal combustion engine and its components, which is at least one of configured and programmed such that it operates the internal combustion engine, such that at least one environmental parameter is at a predetermined condition according to the closure time of the at least one valve; and wherein the closure time of the at least one valve is set such that the respective predetermined conditions of at least two environmental parameters are each between respective minimum and maximum values, the at least two environmental parameters having an inverse relationship.

\* \* \* \* \*